Feb. 28, 1967 SHOICHI NAKAMURA ETAL 3,306,980

NOISE-LIMITED TYPE FREQUENCY MULTIPLIER FOR FM STEREOPHONIC RECEIVERS

Filed Dec. 19, 1963 2 Sheets-Sheet 1

INVENTORS
Shoichi Nakamura
Tsuneo Okubo
By Stevens, Davis, Miller & Mosher
ATTORNEYS INVENTORS
Shoichi Nakamura
Tsuneo Okubo
By Stevens, Davis, Miller & Mosher
ATTORNEYS 3,306,980

NOISE-LIMITED TYPE FREQUENCY MULTIPLIER FOR FM STEREOPHONIC RECEIVERS

Shoichi Nakamura, Tondabayashi-shi, Osaka, and Tsuneo Okubo, Moriguchi-shi, Osaka, Japan, assignors to Matsushita Electric Industrial Co., Ltd., Osaka, Japan, a corporation of Japan Filed Dec. 19, 1963, Ser. No. 331,728
Claims priority, application Japan, Dec. 21, 1962, 37/58,477
6 Claims. (Cl. 179—15)

This invention relates to a noise-limited type frequency multiplier comprising at least two amplifiers with their cathodes coupled in a direct-current fashion, and a full-wave rectifier circuit arranged between the anode of the first amplifier and the controlling electrode of the second amplifier, whereby the multiplier is controlled by a rectified voltage in a manner such that a frequency-multiplied wave of a predetermined amplitude can be taken from the anode of the second amplifier when an alternating-current input voltage entering the controlling electrode of the first amplifier exceeds a specified value.

As is well known, the FM stereo broadcast, popularized in recent years, can be received broadly by the following two procedures. In one procedure, a reinsert subcarrier is formed from a pilot carrier of 19 kc./s. and is superimposed on a subchannel signal for conversion into an amplitude-modulated wave, which is detected and then passed together with the main channel signal through a matrix circuit to be divided into right and left signals. In the other procedure, a switching signal is formed from the pilot carrier and used to switch the stereo composite signal to separate right and left signals. In either procedure of receiving the stereo broadcast, the pilot carrier is indispensable and the reinsert subcarrier or the switching signal has a frequency of 38 kc./s., which is just twice as high as that of the pilot carrier. The present invention is intended to provide a frequency multiplier for use in such application which is highly efficient in operation.

In most previous frequency multipliers, the signal is directed through a nonlinear circuit to separate the second harmonic of the signal, or the signal component is full-wave rectified and only the basic wave of the rectifier output is fed out. In either case, a difficulty is involved that the noise component of the input signal is simultaneously amplified particularly when the signal is feeble. Thus, either system is regarded as inappropriate as a frequency doubler for use in receiving the stereo broadcast particularly of the FM multiplex system.

An improved form of frequency multiplier is also well known which utilizes the oscillation energy of a free-running osciialtor separately provided and synchronizing it with the given input signal or a signal multiplied by either of the above known systems.

This system also involves a deficiency that the oscillator tends to operate out of phase with the input signal when it is feeble and that it is impossible to turn on and off an indicator provided to indicate the presence of the sync input signal. The latter difficulty is serious particularly with FM stereo receivers. As is known, the FM stereo broadcast generally includes a monophonic broadcast mixed thereto and the only means for discrimination therebetween relies upon the presence or absence of a pilot carrier. However, free-running oscillator type multipliers operating in phase with the pilot carrier invariably involve a high energy of approximately 19 or 38 kc./s. and this makes it extremely difficult to switch on and off the stereo indicator.

To meet this situation, a further system has previously been proposed which includes a synchronized oscillation arrangement operable solely in the presence of a pilot carrier exceeding a specified value, or a single-valve D.C. positive feedback arrangement reversible between the nonconducting and conducting states of the valve in the presence of a pilot carrier exceeding the specified value.

In such system, a neon lamp can be used to indicate the presence or absence of the signal. The former arrangement, however, involves a problem of reducing the trigger hysteresis, that is, the difference between the operative level of the controlling signal input where it varies from a minimum to a maximum and the inoperative level where it varies from a maximum to a minimum. With the latter arrangement, the supply voltage to the anode must be raised in order to connect the neon indicator directly to the multiplier. This makes the arrangement unsuitable, for example, for use in simple transformerless receivers (referring to the receiver power supply), as is well known.

The difficulties of the various previous circuitries can all be overcome by the circuit arrangement of the present invention, which is fully effective to switch on and off a neon indicator even when used in cheap and simple transformerless stereo receivers having a D.C. voltage supply of 100 volts or less and is particularly suitable for use in FM stereo receivers.

The foregoing and other objects and advantages of the present invention will become apparent from the following detailed description when taken in conjunction with the accompanying drawings, which illustrate some preferred embodiments of the invention and in which.

Figure 1:
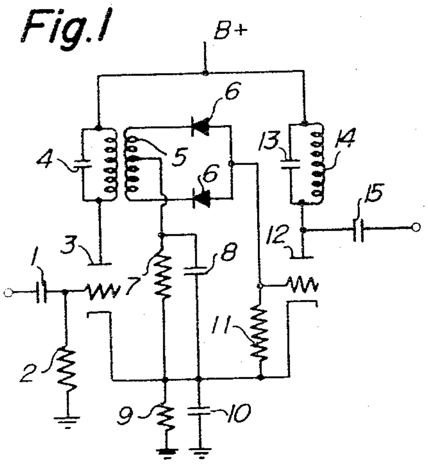
FIG. 1 is a circuit diagram of one embodiment of the invention.
Figure 2:
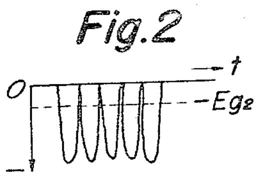
FIGS. 2 and 3 illustrate waveforms of the input to the second amplifier.

Referring first to FIG. 1, the circuit arrangement includes a first and a second amplifier 3 and 12 which are arranged so that when no signal input exists the first amplifier 3 is in a cutoff state while the second amplifier 12 is in a conducting state. To this end, the grid leak resistance 2 of the first amplifier 3 is grounded at one end and the resistance 11 connected to the grid of the second amplifier 12 is connected at one end to the cathodes of the amplifiers with a bypass capacitor 10 and a parallel resistance 9 arranged so that the amplifiers 3 and 12 are cathode-coupled in a direct-current fashion. With this arrangement, it will be noted that, even if an A.C. input voltage lower than the reference value is applied through a coupling capacitor 1 to the controlling electrode of the amplifier 3, it remains in the cutoff state and ineffective and no multiplication effect is obtained. However, for an A.C. input signal of the prescribed frequency having an amplitude larger than the specified value, an anode current takes place through the amplifier at the peak value of the signal input and an amplified signal voltage appears across the anode resonance circuit 4 and induces a signal in the secondary winding 5 of the anode resonance circuit 4 having a medial tap. This signal is full-wave rectified by diodes 6, 6 to apply a signal wave as shown in FIG. 2 to the controlling electrode of the second amplifier 12. On the other hand, the D.C. component occurring at the same time flows in a direction from a resistance 7 parallel to capacitor 8 toward the resistance 11. As the result, the control grid of the second amplifier 12 becomes negative in potential relative to its cathode to reduce the anode current of this amplifier and hence the voltage across the resistance 9. Accordingly, the operative point of the first amplifier is shifted in a direction to enhance its amplifying action. This further reduces the anode current of the second amplifier 12 and increases the gain of the first amplifier still further. This phenomenon is automatically repeated until the gain of the first amplifier 3 reaches its maximum to assume a balanced state. The time taken to reach this state depends upon the resistance 9 and capacitance 10 but can be regarded as instantaneous from the practical viewpoint. In this balanced state, the negative D.C. voltage component between the controlling electrode and cathode of the second amplifier 12 depends upon the division ratio between the combined equivalent D.C. resistance of the capacitor 8 and resistance 7, on one hand, and the resistance 11, on the other hand, but is given such a value as to place the second amplifier 12 in the vicinity of its cutoff state by proper selection of the circuit elements 7, 8 and 11. The value is indicated as $-Eg2$ in FIG. 2. Thus, the second amplifier 12 now functions as an amplifier only upon such A.C. component as having a value large than $-Eg2$. This component is a frequency-multiplied pulse wave having a value in the range of $0>-Eg2$. Thus, it will be noted that a desired multiplied signal can be obtained through a direct-current blocking capacity 15 by selecting the values of the capacity 13 and coil 14 so that a resonance to the basic wave is obtained through the anode of the second amplifier 12.

Another feature of this system lies in its improved noise characteristic. The reference value is set in the known manner so that the multiplying function is generally interrupted for signals having an amplitude lower than a specific level.

Figure 3:
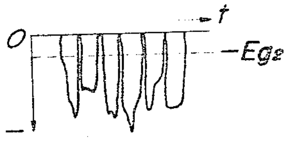

The previous system, has involved a difficulty that, if the original signal includes superimposition of some noise, the system is susceptible to such noise when the desired signal input has a level exceeding the reference value since the peak portion of the signal is frequency-multiplied. According to the present system, however, any noise possibly included in a desired signal exceeding the reference value has only a substantially reduced effect even if such signal is fullwave-rectified by the rectifiers 6 and a waveform such as shown in FIG. 3 appears at the grid of the second amplifier, since the latter has an amplifying effect only upon that portion of the signal wave which ranges from zero to $-Eg2$. In other words, with this system, there is no need of directing the original signal to the multiplier circuit through a slicer circuit for the purpose of removing the noise component of the signal because the chopping of the top and bottom portion of the original signal is equivalent to the chopping of the peak portion of the signal after it has been fullwave-rectified.

Figure 4:
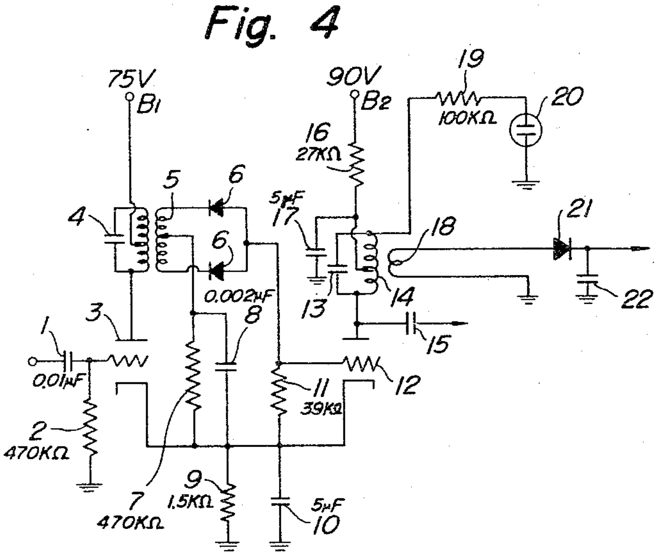

One practical form of the present system is illustrated in FIG. 4, which is advantageously applicable, for example, to a transformerless FM multiplex stereo receiving set fed with a lower D.C. supply voltage. The anode voltage of the first multiplier 3 in this illustration is only of the order of approximately 75 volts. This system is also distinguishable from the one shown in FIG. 1 in that the D.C. anode current of the second amplifier 12 is taken through a resistance 16 just behind the source rectifier. With such arrangement, the anode voltage of the amplifier 12 when conducting is approximately 50 volts and that when nonconducting is over 80 volts. Therefore, when no desired or pilot signal exists, the neon indicator, arranged in series with resistance 19, is in an extinct state. However, upon arrival of an input signal, the neon indicator is turned on since the amplifier 12 is biased close to the cutoff state and the D.C. voltage of over 80 volts is superimposed upon the multiplied signal. It is noted, therefore, that a stereo indication is obtained easily with the transformerless receiving set. As shown, the coil 14 is provided with a secondary winding 18 and its output is rectified by a diode 21. The rectified output is effective to render the receiver inoperative when no stereo signal arrives. A capacitor 22 is employed as a filter for removing any A.C. component of the output. This arrangement is based upon the fact that with no pilot carrier the output voltage at the coil end is reduced to zero but a multiplied voltage of 20 volts or over appears when a pilot carrier is provided. The actual values of various circuit constants are indicated in FIG. 4 by the respective components.

Figure 5:
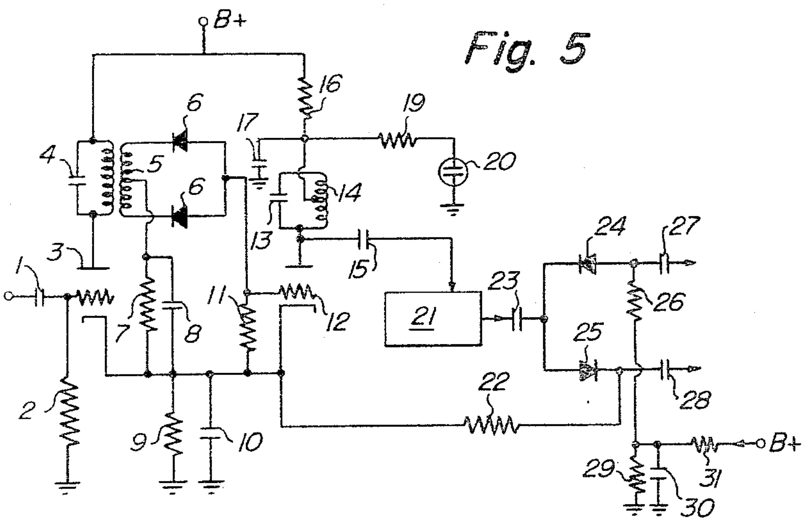

FIG. 5 illustrates another embodiment of the present system as applied to an automatic mono-to-stereo switching circuit. For detection of the FM stereo broadcast, the subchannel signal is converted into an AM signal as at 21, which is detected by diodes 24 and 25 in the conventional manner. The detected signal is directed through capacitances 27 and 28 to a matrix circuit. If a monophonic signal is received without disconnecting the circuit, the monophonic signal being directed back from the matrix circuit is distorted by the diodes 24 and 25, as is well known in the art.

To meet this difficulty, the illustrated circuit is arranged so as to render the diodes 24 and 25 nonconducting during reception of a monophonic broadcast by utilization of the fact that the voltage appearing across the resistance 9 of the frequency doubler of the present invention depends upon the presence or absence of the pilot signal. In more detail, in the event that no pilot carrier exists the second amplifier 12 is highly conducting and has a cathode voltage of, say, 5 volts, and otherwise the cathode voltage is reduced to the order of 2 volts.

In this case, it will be understood that the potential difference between the junction of the diode 24 to resistance 26 and the junction of the diode 25 to resistance 29 is reduced to zero during stereo operation if the junction between the B-voltage dividing resistances 29 and 31 is maintained at a voltage of the order of 2 volts. For the monophonic broadcast, however, the above potential difference is reversed and obtains a value of approximately 3 volts, which is enough to render the diodes nonconducting. Accordingly, with this automatic switching circuit, no distortion takes place even when the receiver is switched from the stereo to the monophonic broadcast. Also, in the event that the rate of amplitude modulation of the subchannel signal is lower, the junction between resistances 26 and 29 can be grounded without involving any trouble. The distortion of the monophonic signal may also be eliminated by reversing the polarity of both diodes 24 and 25 and biasing them in the forward direction during nonstereo operation. These modifications each represent a partial application of the frequency multiplier of the present invention.

Figure 6:
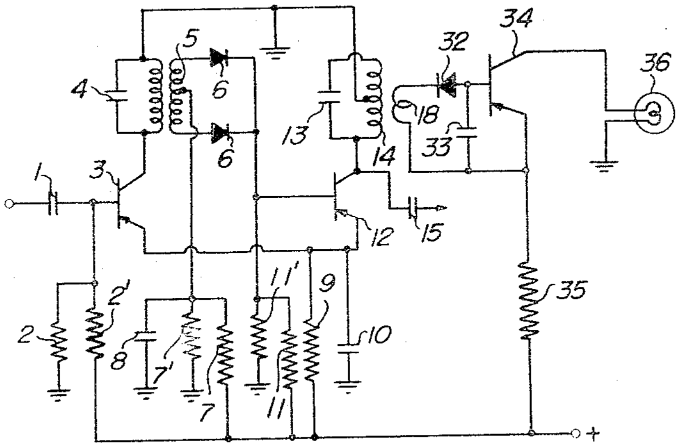
FIGS. 4, 5 and 6 are circuit diagrams of different applications of the invention.

FIG. 6 represents a transistorized embodiment of the present invention. Though in this embodiment p-n-p type units are employed they may apparently be replaced by n-p-n type units. The major distinguishing feature of the transistorized circuit arrangement over the one employing vacuum tubes lies in the manner of biasing their controlling electrodes. Thus, in this case there are provided resistance 2 and 2' for the first amplifier 3 and resistances 11 and 11' for the second amplifier 12. Also, a resistance 7' is added for biasing the diodes 6 and 6. The resistance 7' is selected so that the differential potential across the diodes 6, 6 is reduced to zero or slightly reversed and may apparently be applied in the same fashion as the vacuum tube arrangement. Biasing the diodes 6, 6 in the reverse direction results in a feature that the specified value of the desired signal input voltage depends not only on the first amplifier 3 but also on the reverse biasing voltage. In the illustrated circuit arrangement, employing p-n-p transistors, the diodes 6 and 6, have evidently an opposite polarity to that in FIG. 1, but the arrangement operates on quite the same principles as the latter. Thus, biasing resistances 11, 11', 2 and 2' are selected so that the anode current of the second amplifier 12 is larger than that of the first amplifier 3.

As shown in FIG. 6, an additional circuit is provided in the transistorized arrangement so that the pilot lamp indicator is turned on upon arrival of the desired signal. When no desired signal arrives and no voltage is induced across the secondary winding 18 of the coil 14, the base and the emitter of the transistor 34 is interconnected by the diode 32 and secondary winding 18 causing no collector current. However, upon arrival of the desired signal, the rectifying effect of the diode 32 makes the base negative in potential relative to the emitter causing a collector current through resistance 35, transistor 34 and pilot lamp 36 to turn on the latter. The resistance 35 is provided to limit the collector current and is selected in conformity with the current capacity of the pilot lamp. A capacitor 33 serves as a filter for the rectifier circuit.

Figure 7:
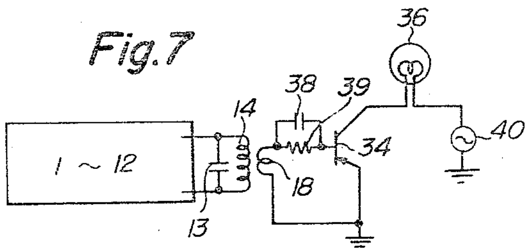
FIG. 7 illustrates a modified form of the pilot lamp indicator.

FIG. 7 illustrates another arrangement of the pilot lamp indicator circuit. With this arrangement, the output of coil 14 upon arrival of the desired signal is applied to the base of transistor 34 without being rectified with an A.C. power source directly connected to the collector circuit. Therefore, at the instant when the two A.C. signals exert a biasing effect between the base and the emitter of the transistor in the forward direction and between the collector and the base in the reverse direction, a substantial collector current is produced to turn on the pilot lamp 36. The capacitor 38 and resistance 39 are selected to exhibit a lower impedance at higher frequencies and a higher impedance at lower frequencies. With the capacitor and resistance selected in this manner, where the A.C. power source 40 is a commercial frequency source, a forward bias is effected between the base and the collector of the transistor while a reverse bias is effected between the emitter and the base thereof. Therefore, any breakdown of the transistor is effectively prevented which may otherwise take place at the instant when a substantial emitter current flows. Apparently, the circuit including the capacitor 38 and resistance 39 may be replaced by the diode 32 and capacitor 33 illustrated in FIG. 6 for rectification of the multiplied output voltage of the desired wave.

As apparent from the foregoing description, the noise-limited frequency multiplier of the present invention is of simplified construction having high performance characteristics and very convenient for connection of additional circuits such as an indicator circuit and a squelch automatic select circuit.

It will further be recognized that the present frequency multiplier can not only serve as a frequency doubler but also can be employed to multiply the basic frequency of the input signal by any desired even number, the multiplication being adjustable simply by properly selecting the resonance frequency of the resonance circuit comprised of coil 14 and capacitor 13.

What is claimed is:

1. A noise-limited type frequency multiplier for FM stereophonic receivers comprising a first amplifier, a second amplifier, each of said amplifiers having at least an active element having a plurality of electrodes, the controlling electrodes of said amplifiers being so biased that under no signal condition the first amplifier is made nonconductive and the second amplifier is made conductive, a resonance circuit connected to the anode electrode of said first amplifier, a full-wave rectifier circuit through which an ouput signal across the terminals of said resonance circuit is fed to the controlling electrode of said second amplifier, said resonance circuit being tuned at the pilot signal frequency, the sense of said full-wave rectifier circuit being such that it renders said second amplifier less conductive, the cathodes of said first and second amplifiers being resistance coupled to each other to form a D.C. positive feedback loop, whereby the frequency multiplier is operative to substantially reverse the conducting states of said amplifiers only in response to an input pilot signal which exceeds a predetermined level.

2. A noise-limited type frequency multiplier for FM stereophonic receivers according to claim 1, in which a second resonance circuit tuned at twice the pilot signal frequency and a resistance series connected therewith are connected in the anode circuit of said second amplifier, and a pilot lamp is connected between ground and the junction of said second resonance circuit and said resistance.

3. A noise-limited type frequency multiplier for FM stereophonic receivers according to claim 1, in which said active elements are transistors and a second resonance circuit tuned at twice the pilot signal frequency is provided in the anode circuit of said second amplifier, and a pilot lamp between the collector electrode and the emitter electrode of said transistor, said second resonance circuit having a secondary winding the output of which is applied across the base and emitter electrodes of said transistor.

4. A noise-limited type frequency multiplier for FM stereophonic receivers according to claim 1, in which a second resonance circuit, tuned at twice the pilot signal frequency, is provided in the anode circuit of said second amplifier, said second resonance circuit having a secondary winding the output of which is fed to a squelch circuit through a rectifying circuit.

5. A noise-limited type frequency multiplier for FM stereophonic receivers according to claim 1, in which the voltage potential of the cathode of said second amplifier is applied to diodes of a subchannel detector circuit which are connected in an opposite sense with respect to the detecting characteristics so that said diodes may be slightly inverse-biased during stereophonic broadcast reception and may be deeply inverse-biased during monophonic broadcast reception.

6. A noise-limited type frequency multiplier for FM stereophonic receivers according to claim 1, in which the voltage potential of the cathode of said second amplifier is applied to diodes of a subchannel detector circuit which are connected in an opposite sense with respect to the detecting characteristics so that said diodes may be conducting during monophonic broadcast reception.

References Cited by the Examiner

UNITED STATES PATENTS

| | | | |
|---|---|---|---|
| 3,116,372 | 12/1963 | Wolff | 179—15 |
| 3,170,040 | 2/1965 | O'Connel | 179—15 |
| 3,198,885 | 8/1965 | Limberg | 179—15 |
| 3,242,264 | 3/1966 | DeVries | 179—15 |

DAVID G. REDINBAUGH, *Primary Examiner.*

ROBERT L. GRIFFIN, *Examiner.*